US008019382B2

(12) United States Patent
Rush et al.

(10) Patent No.: US 8,019,382 B2
(45) Date of Patent: Sep. 13, 2011

(54) COMMUNICATION APPARATUS HAVING A STANDARD SERIAL COMMUNICATION INTERFACE COMPATIBLE WITH RADIO ISOLATION

(75) Inventors: Frederick A. Rush, Austin, TX (US); Satish S. Kulkarni, Austin, TX (US)

(73) Assignee: ST-Ericsson SA, Plan-Les-Ouates (CH)

( * ) Notice: Subject to any disclaimer, the term of this patent is extended or adjusted under 35 U.S.C. 154(b) by 889 days.

(21) Appl. No.: 11/025,672

(22) Filed: Dec. 29, 2004

(65) Prior Publication Data

US 2006/0141946 A1    Jun. 29, 2006

(51) Int. Cl.
*H04M 1/00* (2006.01)

(52) U.S. Cl. .............. 455/553.1; 455/417; 455/418; 455/426.1

(58) Field of Classification Search ............ 455/553.1
See application file for complete search history.

(56) References Cited

U.S. PATENT DOCUMENTS

| | | | |
|---|---|---|---|
| 4,384,361 A | 5/1983 | Masaki | |
| 4,805,165 A | 2/1989 | Kawamura et al. | |
| 4,870,699 A | 9/1989 | Garner et al. | |
| 4,879,758 A | 11/1989 | DeLuca et al. | |
| 4,930,126 A | 5/1990 | Kazecki et al. | |
| 4,996,639 A | 2/1991 | Ishimoto et al. | |
| 5,031,233 A | 7/1991 | Ragan | |
| 5,058,203 A | 10/1991 | Inagami | |
| 5,142,699 A | 8/1992 | Sato et al. | |
| 5,150,361 A | 9/1992 | Wieczorek et al. | |
| 5,150,412 A * | 9/1992 | Maru | 380/43 |
| 5,151,769 A | 9/1992 | Immorlica, Jr. et al. | |
| 5,241,541 A | 8/1993 | Farrell et al. | |
| 5,249,218 A * | 9/1993 | Sainton | 455/418 |
| 5,280,644 A | 1/1994 | Vannatta et al. | |
| 5,307,066 A | 4/1994 | Kobayashi et al. | |
| 5,355,524 A | 10/1994 | Higgins, Jr. | |
| 5,404,547 A | 4/1995 | Diamantstein | |
| 5,448,755 A | 9/1995 | Tanaka | |
| 5,460,444 A * | 10/1995 | Howorka | 366/3 |
| 5,471,471 A | 11/1995 | Freeburg et al. | |

(Continued)

FOREIGN PATENT DOCUMENTS

EP      0447302 A1    9/1991

(Continued)

OTHER PUBLICATIONS

U.S. Appl. No. 10/426,042, filed Apr. 29, 2003, Sooch et al.

*Primary Examiner* — Duc Nguyen
*Assistant Examiner* — Ajibola Akinyemi
(74) *Attorney, Agent, or Firm* — Howison & Arnott, L.L.P.

(57) ABSTRACT

A communication apparatus including a digital processing circuit coupled to a radio frequency (RF) circuit and to a serial communications device. The serial communications device may be configured to buffer data communicated between the digital processing circuit and an external device. A portion of the serial communications device may be disabled during an active mode of operation of the RF circuit. The serial communications device may include a flow control logic circuit configured to control a data stream between the digital processing circuit and the external device while a portion of the serial communications device is disabled. In some embodiments, a portion of the digital processing circuit may be disabled during an active mode of operation of the RF circuit.

27 Claims, 6 Drawing Sheets

U.S. PATENT DOCUMENTS

| | | | |
|---|---|---|---|
| 5,471,663 A | 11/1995 | Davis | |
| 5,475,684 A | 12/1995 | Shimizu | |
| 5,519,711 A | 5/1996 | Sointula | |
| 5,604,928 A | 2/1997 | Hamano et al. | |
| 5,630,224 A | 5/1997 | Swail | |
| 5,640,444 A * | 6/1997 | O'Sullivan | 455/552.1 |
| 5,649,160 A | 7/1997 | Corry et al. | |
| 5,715,274 A * | 2/1998 | Rostoker et al. | 375/130 |
| 5,758,278 A | 5/1998 | Lansdowne | |
| 5,764,693 A | 6/1998 | Taylor et al. | |
| 5,812,936 A | 9/1998 | DeMont | |
| 5,838,741 A | 11/1998 | Callaway, Jr. et al. | |
| 5,842,037 A | 11/1998 | Haartsen | |
| 5,872,540 A | 2/1999 | Casabona et al. | |
| 5,875,449 A | 2/1999 | Ono | |
| 5,917,854 A | 6/1999 | Taylor et al. | |
| 5,920,592 A | 7/1999 | Tanaka et al. | |
| 5,923,761 A | 7/1999 | Lodenius | |
| 5,953,640 A | 9/1999 | Meador et al. | |
| 6,020,614 A | 2/2000 | Worley | |
| 6,243,597 B1 | 6/2001 | Daanen | |
| 6,246,335 B1 | 6/2001 | Tsunoda | |
| 6,363,439 B1 * | 3/2002 | Battles et al. | 710/36 |
| 6,366,622 B1 | 4/2002 | Brown et al. | |
| 6,405,049 B2 * | 6/2002 | Herrod et al. | 455/517 |
| 6,480,553 B1 | 11/2002 | Ho et al. | |
| 6,498,819 B1 | 12/2002 | Martin | |
| 6,510,185 B2 | 1/2003 | Lee et al. | |
| 2002/0080728 A1 | 6/2002 | Sugar et al. | |
| 2003/0020521 A1 | 1/2003 | Lee et al. | |
| 2005/0268129 A1* | 12/2005 | Julicher et al. | 713/322 |
| 2006/0128376 A1* | 6/2006 | Alexis | 455/426.1 |

FOREIGN PATENT DOCUMENTS

| | | |
|---|---|---|
| EP | 0447302 B1 | 9/1991 |
| EP | 00463621 A1 | 1/2000 |
| EP | 00463621 B1 | 1/2000 |

* cited by examiner

COMMUNICATION APPARATUS HAVING A STANDARD SERIAL COMMUNICATION INTERFACE COMPATIBLE WITH RADIO ISOLATION

BACKGROUND OF THE INVENTION

1. Field of the Invention

This invention relates generally to communication apparatus including radio frequency (RF) circuits and, more particularly, to serial communications devices within communication apparatus.

2. Description of the Related Art

High performance wireless communication apparatus such as RF receivers, transmitters, and transceivers typically include RF front-end circuitry that operates on an RF signal being received or transmitted. For example, the front-end circuitry may down-convert a received RF signal to baseband and/or up-convert a baseband signal for RF transmission.

The RF front-end circuitry typically includes analog circuits such as low noise amplifiers and mixers that have a relatively high sensitivity to noise and interference. The RF circuitry in some applications, such as in mobile communication cellular handsets, may be required to detect signals as small as a few micro-volts or less in amplitude. It is thus often important to minimize noise and interference from sources external or even internal to the communication apparatus.

In addition to the RF front-end circuitry, typical wireless communication apparatus may also include digital processing circuitry that performs various digital functions including, for example, low level baseband signal processing, implementation of the communication protocol stack, and various user interface functionality. The digital processing circuitry may include a variety of specific hardware such as a DSP (digital signal processor), an MCU (microcontroller unit), hardware accelerators, memory, and/or I/O interfaces, among numerous other specific hardware devices.

Unfortunately, the digital processing circuitry of a typical communication apparatus can be a significant source of detrimental noise and interference. More particularly, the digital processing circuitry in a typical high performance communication apparatus produces digital signals with relatively small rise and fall times, or with fast transitions or sharp edges. Furthermore, those signals often have relatively high frequencies. As a result, their Fourier series or transforms have rich harmonic contents. The harmonics, or higher-frequency Fourier series components, cause spurious emissions that may interfere with, and may adversely impact, the performance of the RF front-end circuitry. Thus, in many systems, the RF front-end circuitry is implemented on an integrated circuit die that is separate from the integrated circuit die on which the digital processing circuitry is implemented. Additionally, the RF front-end circuitry and digital processing circuitry are often placed in separate electrical cavities, where the shielding of the cavities helps to isolate the electrical and magnetic coupling.

Implementing the RF front-end circuitry and the digital processing circuitry on separate dies, however, has several disadvantages, such as increased component count, size, and overall cost, and more potential for decreased reliability and increased manufacturing failures. It is thus desirable to allow integration of the RF front-end circuitry and digital processing circuitry on a single integrated circuit die without significant degradation of performance due to interference.

In addition to the foregoing design considerations, it is typical for a wireless communication apparatus to include a serial interface to an external computing device so that the communication apparatus may act as a data modem. For example, a standard EIA/TIA-232-E serial interface may accommodate communications between a communication apparatus and common external devices such as a personal computer (PC) or personal digital assistant (PDA). A common implementation for these serial interfaces is to incorporate a serial communications device such as a universal asynchronous receiver transmitter (UART) in the external device as well as the communication apparatus. In this arrangement, the serial communications device implements handshake protocols, baud rate detection, and flow control. Because serial communications devices are so prevalent and their characteristics so well known, external devices are designed with the expectation that the serial communications device in a communication apparatus will conform to typical operation. Accordingly, the serial communications device in a communication apparatus may be expected to provide full duplex, high availability communication at a constant clock rate during the transfer of large files, with prompt responses to flow control signals.

SUMMARY OF THE INVENTION

Various embodiments of a communication apparatus are disclosed. In one embodiment, a communication apparatus (e.g., a mobile phone) includes a digital processing circuit coupled to a radio frequency (RF) circuit and to a serial communications device. The serial communications device may be configured to buffer data communicated between the digital processing circuit and an external device. A portion of the serial communications device may be disabled during an active mode of operation of the RF circuit. The serial communications device may include a flow control logic circuit configured to control a data stream between the digital processing circuit and the external device while a portion of the serial communications device is disabled. In some embodiments, a portion of the digital processing circuit may be disabled during an active mode of operation of the RF circuit.

Figure 1:
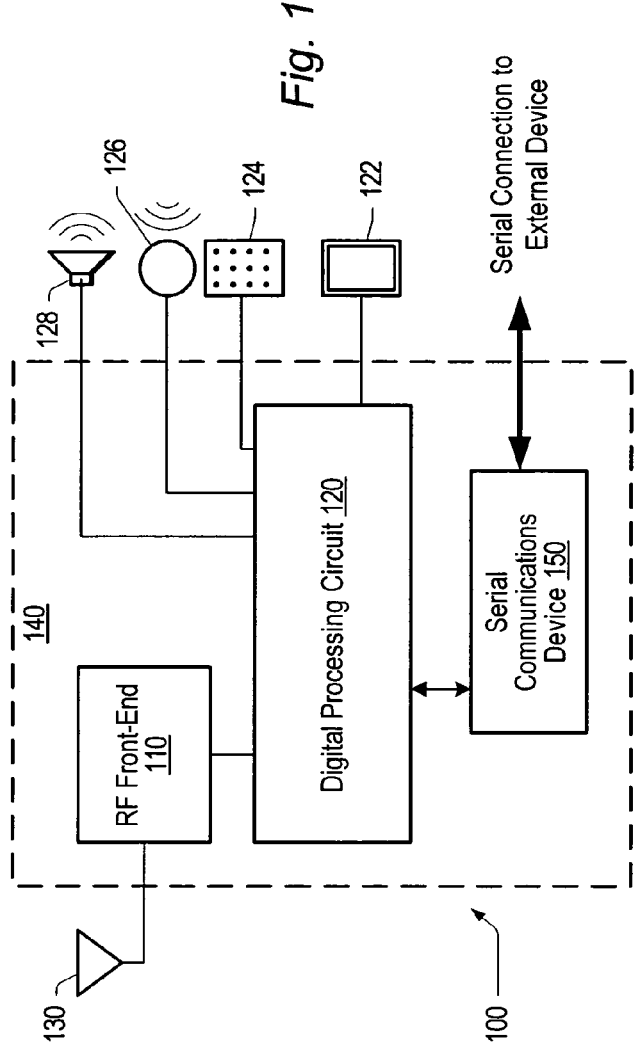
FIG. 1 illustrates a generalized block diagram of a communication apparatus including an RF front-end circuit and a digital processing circuit.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a generalized block diagram of a communication apparatus 100 including an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may implement a time-division multiple access (TDMA) standard such as the Global System for Mobile Communications (GSM) standard, the Personal Communications Service (PCS) standard, the Digital Cellular System (DCS) standard, the General Packet Radio Service (GPRS) standard, and/or the Enhanced General Packet Radio Service standard (E-GPRS), which may also be referred to as the Enhanced Data for GSM Evolution (EDGE) standard, among others.

RF front-end circuit 110 may accordingly include circuitry to provide the RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable MCU and/or DSP, as well as a variety of specific peripheral circuits such as memory controllers, direct memory access (DMA) controllers, hardware accelerators, voice coder-decoders (CODECs), digital audio interfaces (DAI), and user interface circuitry. The choice of digital processing hardware (and firmware/software, if included) depends on the design and performance specifications for a given desired implementation, and may vary from embodiment to embodiment.

As shown, communication apparatus 100 also includes a serial communications device 150. Serial communications device 150 is provided to accommodate communication between digital processing circuit 120 and a variety of external devices such as a personal computer (PC) or personal digital assistant (PDA). The connection to the external device may be via a multi-pin electrical connector, Infrared Data Association (IrDA) compatible infrared wireless data communication link, or other types of serial connection, as desired depending on the application and packaging of communication apparatus 100. In one particular implementation, serial communications device 150 embodies a universal asynchronous receiver transmitter (UART) circuit. Further details regarding aspects of embodiments of serial communications device 150 are provided below.

The inclusion of serial communications device 150 may allow communication apparatus 100 to operate as a data modem for the external device that is connected to serial communications device 150. It is noted that in some embodiments, communication apparatus 100 may include more than one serial communications device, each implementing substantially the same functionality as serial communications device 150. The number of serial communications devices included in a particular embodiment of communication apparatus 100 may vary depending on the performance and functionality desired.

Figure 2:
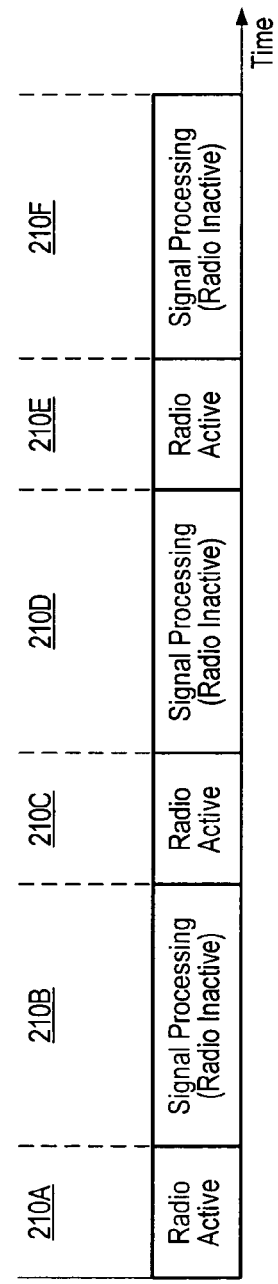
FIG. 2 illustrates a set of events that occur in a communication apparatus according to time domain isolation.

In one embodiment, RF front-end circuit 110, digital processing circuit 120, and serial communications device 150 may be integrated on the same integrated circuit die 140. To reduce interference and thus accommodate high performance functionality, communication apparatus 100 may implement a technique referred to as time domain isolation, or TDI. FIG. 2 illustrates a set of events that occur in communication apparatus 100 according to time domain isolation. Broadly speaking, two alternative events take place in such a system: RF reception or transmission, and signal processing. The system arranges in time the RF reception or transmission activities and the signal processing activities so as to avoid or reduce interference between the RF front-end circuit 110 and digital processing circuit 120.

As shown in FIG. 2, communication apparatus 100 employs a plurality of timeslots 210A-210F, and so on. During RF timeslots 210A, 210C, and 210E, RF front-end circuit 110 may receive RF signals, process the received signals, and store the results. Subsequently, during signal processing timeslots 210B, 210D, and 210F, respectively, digital processing circuit 120 may perform signal processing tasks on the stored results.

Alternatively, during RF timeslots 210A, 210C, and 210E, RF front-end circuit 110 may transmit RF signals. Thus, in this mode of operation, during signal processing timeslots 210B and 210D, digital processing circuit 120 perform signal processing tasks on input data (e.g., voice, data), and store the results. Subsequently, during RF timeslots 210C and 210E, respectively, RF front-end circuit 110 may perform RF operations on the stored results (for example, up-conversion) and transmit an RF signal.

It is noted that, depending on the specific protocol, architecture, and circuitry used, communication apparatus may receive and transmit simultaneously, as desired. More commonly, however, the system either transmits signals or receives signals during any one of RF time-slots 210A, 210C, 210E, etc. For example, a GSM-compliant system or apparatus, such as a mobile telephone that complies with the GSM specifications, either receives or transmits RF signals in one or more bursts of activity during each of RF time-slots 210A, 210C, 210E, etc.

It is further noted that the RF time-slots may have the same or different durations, as desired. RF time-slots may have unequal lengths so as to accommodate a wide variety of circuitry, systems, protocols, and specifications, as desired.

Similarly, the signal-processing time-slots may have similar or dissimilar durations, as desired. Each of signal-processing time-slots 210B, 210D, 210F, etc. may include several other time-slots or time divisions, depending on the particular communication protocol and/or signal-processing techniques and the particular circuitry and technology used. For example, a signal-processing time-slot may include several time-slots, with a portion or a particular circuit of digital processing circuit 120 actively processing signals during one or more of the time-slots.

To implement time domain isolation, digital processing circuit 120 may be placed in a shutdown mode of operation when an RF timeslot commences (i.e., when the radio is active). In one embodiment, during the shutdown mode of operation, a clock signal or signals within digital processing circuit 120 are disabled or inhibited. More specifically, by using static metal oxide semiconductor (MOS) circuitry, for example, the clock signal or signals within digital processing circuit 120 may be shut down without losing data present within that circuitry. Accordingly, digital processing circuit 120 can preserve the data within it while the RF front-end circuit 110 is active. Once the RF front-end circuit 110 has completed its reception or transmission (e.g., an RF timeslot has ended), the shutdown mode of digital processing circuit 120 may be discontinued by re-enabling the clock signal or signals. Digital processing operations on the data may then continue or commence. By disabling the clock or clocks in digital processing circuit 120 while RF front-end circuit 110 is active (i.e., receiving or transmitting), the amount of digital noise and thus spurious signals at the RF band of interest may be reduced, thus accommodating high performance.

It is noted that although FIG. 2 depicts the operation of the RF front-end circuit 110 and the signal processing operations as alternative events, these operations need not be mutually exclusive. Generally, it may be desirable to reduce or minimize the amount of overlap between the operation of the RF front-end circuit 110 and the signal processing operations. Depending on a number of factors, however, the active operation of RF front-end circuit 110 and signal processing operations of digital processing circuit 120 may overlap to a certain extent.

It is also noted that in some alternative embodiments, the shutdown mode of digital processing circuit 120 may be implemented by causing at least portions of the circuitry to be held inactive or to be otherwise inhibited using other techniques (i.e., other than by disabling a clock signal(s)). For example, power may be removed from particular circuitry within digital processing circuit 120. Likewise, flip-flops or other circuits may be disabled (e.g., through an enable input). In addition, it is noted that some portions of the digital processing circuit 120, such as dynamic memory and flow control logic, may remain active during the shutdown mode (i.e., the circuitry of digital processing circuitry 120 may be partially powered down, disabled, or inhibited during the shutdown mode).

Figure 3:
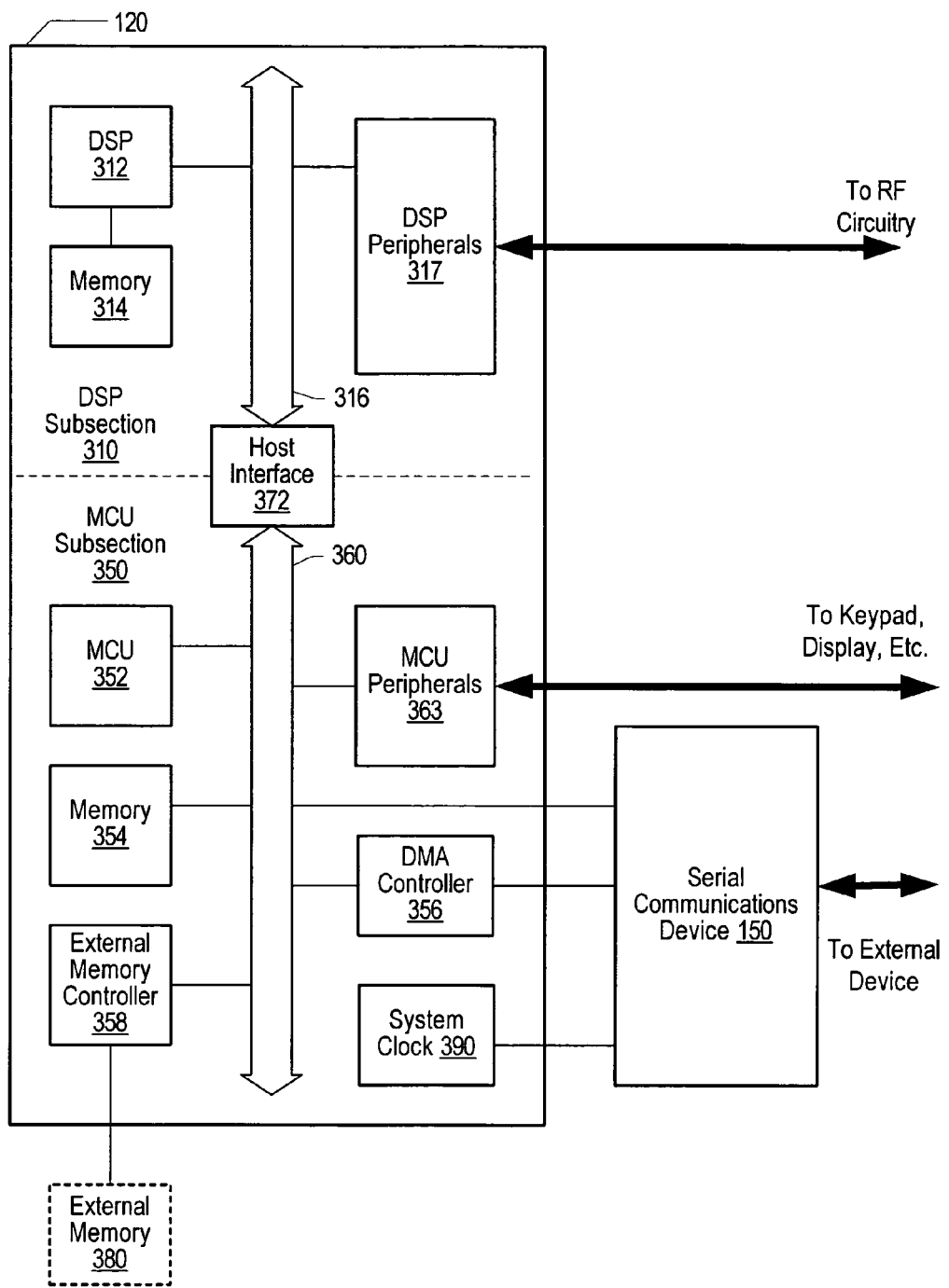
FIG. 3 illustrates a block diagram of an exemplary implementation of circuitry within a digital processing circuit.

FIG. 3 illustrates an exemplary implementation of circuitry within digital processing circuit 120. In this embodiment, digital processing circuit 120 includes a DSP subsection 310 and an MCU subsection 350.

As shown, DSP subsection 310 may include a DSP core 312 coupled to an associated memory 314. Various DSP peripheral devices 317 may be coupled to DSP core 312 through one or more buses 316. In one embodiment, DSP peripherals 317 may include a hardware accelerator, an audio CODEC, a receive buffer, and a transmit buffer. It is noted that the specific number and types of peripheral devices provided within DSP subsection 310 may vary depending upon the application as well as the desired functionality and performance.

Continuing to refer to FIG. 3, MCU subsection 350 includes an MCU core 352 and an associated memory 354 coupled to one or more buses 360. Various peripherals including a DMA controller 356, an external memory controller 358, and various MCU peripherals 363 are shown coupled to MCU 352 through bus 360. A DMA controller 356 and serial communications device 150 are further shown coupled to bus 360.

As shown, MCU subsection 350 may also include a system clock 390. In one embodiment system clock 390 is a fixed rate clock operating at a frequency of 26 MHz. System clock 390 may provide a clock signal to components within digital processing circuit 120 including MCU 352. In the illustrated embodiment, system clock 390 also provides a clock signal to serial communications device 150.

A host interface 372 is further shown for accommodating communications between DSP subsection 310 and MCU subsection 350. An external memory 380 is shown coupled to external memory controller 358. External memory 380 may comprise, for example, SRAM, flash, EEPROM, and/or other types of memory. It is noted that various additional external components (not shown in FIG. 3) may be coupled to digital processing circuit 120 including, for example, a keypad, a display, and a subscriber identity module (SIM) interface. The configuration of FIG. 3 may embody a baseband circuit of, for example, a mobile telephone and/or modem. In one embodiment, digital processing circuit 120 implements both the GSM communication standard as well as the GPRS standard.

During operation, DSP subsection 310 may process data received from RF front-end circuit 110 through a receive buffer included among DSP peripherals 317. DSP subsection 310 may likewise provide processed data to a transmit buffer included among DSP peripherals 317, which is then conveyed to RF front-end circuit 110 through a digital-to-analog converter (DAC). Another DSP peripheral such as an audio CODEC may receive an audio signal from an external microphone or provide an audio signal to a speaker. In some implementations, other DSP peripherals such as a hardware accelerator may perform various low-level signal processing functions such as, for example, filtering, decimation, modulation, demodulation, coding, decoding, correlation and/or signal scaling, as desired.

MCU subsection 350, including programmable MCU 352, may be configured to perform a wide variety of functions using the modules within and externally connected to it. For example, in one implementation, MCU subsection 350 may provide functionality to support the communication protocol stack and various housekeeping tasks. MCU subsection 350 may also perform other processing functionality. For example, MCU subsection 350 may implement interfaces such as an MMI (man-machine-interface) and may provide an execution environment for applications running in the system. In addition, programmable MCU 352 may be configured to execute program instructions that comprise one or more software drivers that control peripheral devices such as serial communications device 150. It is noted that various alternative implementations of MCU subsection 350 are possible, depending upon the desired functionality.

In the illustrated embodiment, serial communications device 150 is shown coupled to bus 360 and to DMA controller 356. In one implementation, short messages and messages having lengths that are unknown before reception are communicated between serial communications device 150 and bus 360, while long messages of known length are transmitted from memory 354 via DMA controller 356 to serial communications device 150. The latter communication path allows for transmission of data from memory 354 without consuming processing cycles of MCU 352, thereby freeing MCU 352 for other tasks. In addition to communicating messages and data between digital processing circuit 120 and an external device, serial communications device 150 may receive configuration data from and transmit status data to MCU 352 through bus 360.

Figure 4:
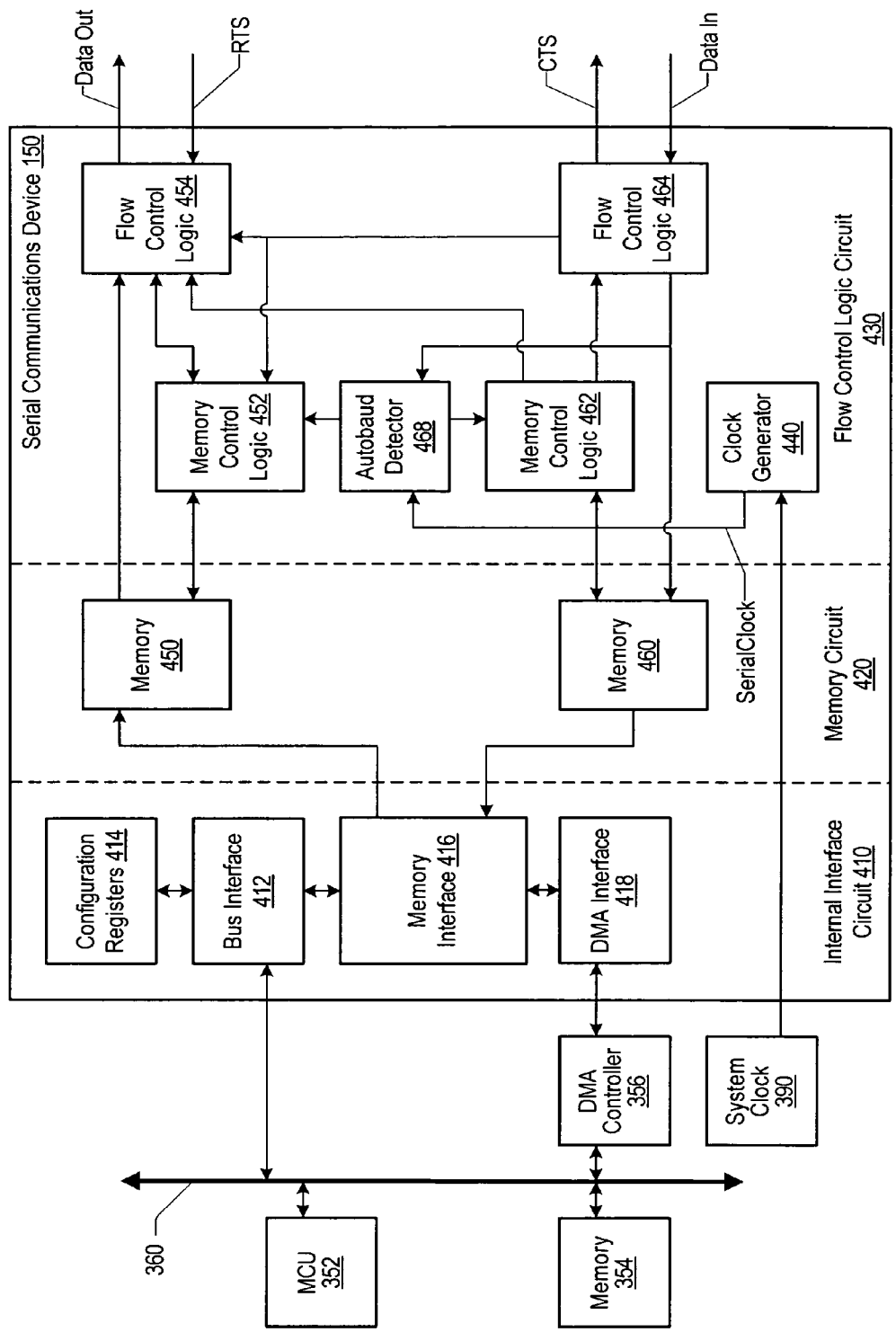
FIG. 4 illustrates a generalized block diagram of a serial communications device.

FIG. 4 illustrates a block diagram of one embodiment of serial communications device 150. Broadly speaking, serial communications device 150 provides conventional serial communication between communication apparatus 100 and an external device. In the illustrated embodiment, serial communications device 150 includes three subsections: an internal interface circuit 410, a memory circuit 420, and a flow control logic circuit 430. Internal interface circuit 410 connects serial communications device 150 to digital processing circuit 120, enabling bi-directional transfer of data, control, and status signals. During operation, memory circuit 420 buffers data passing between an external device and internal interface circuit 410. Flow control logic circuit 430 provides internal clocking, flow control, memory configuration and control, and baud rate detection functions. In one embodiment, internal interface circuit 410 may be disabled while memory circuit 420 and flow control logic circuit 430 remain active during periods of RF activity. Since internal interface circuit 410 may be disabled during periods of RF activity, various serial communication functions that might otherwise be performed by digital processing circuit 120 are instead performed by memory circuit 420 and flow control logic circuit 430, which in the depicted embodiment remain active during periods of RF activity. Specific details of these functions, including data buffering, flow control, and baud rate detection, are described below.

Within internal interface circuit 410, bus interface 412 connects a set of registers to bus 360. Among these registers are configuration registers 414 and a data register within memory interface 416. In operation, configuration registers 414 hold data used to configure the operating modes of serial communications device 150. The data register within memory interface 416 may be configured to hold data for either transmission or reception. In reception, data from memory 460 may be conveyed to the data register within memory interface 416, and then transmitted through bus interface 412 to bus 360. In transmission, data from MCU 352 may be transmitted through bus 360 and bus interface 412 to the data register within memory interface 416, and then conveyed to memory 450. Alternatively, a direct memory access (DMA) path may be used to transfer large, fixed length messages or files to or from memory 450. More specifically, in transmission, data from memory 354 may be transmitted through bus 360, DMA controller 356, and DMA interface 418 to the transmit data register within memory interface 416 and then to memory 450, freeing MCU 352 to perform other tasks during the transmission of large data files. In reception, data from memory 460 may be received via the receive data register within memory interface 416, DMA interface 418, DMA controller 356, and bus 360 to memory 354.

The circuitry that embodies the previously described functionality of internal interface circuit 410 may be a significant source of RF noise. Therefore, in one embodiment, internal interface circuit 410 is disabled during periods of RF activity. Internal interface circuit 410 may be disabled using any of the techniques described above for placing digital processing circuit 120 in a shutdown mode of operation (either full or partial shutdown), such as disabling or inhibiting clock signals, removing power, or disabling flip-flops or other circuits. Broadly speaking, operation of internal interface circuit 410 may alternate with RF reception or transmission, as described above. However, these operations need not be mutually exclusive. Generally, it may be desirable to reduce or minimize the amount of overlap between the operation of RF front-end circuit 110 and internal interface circuit 410. Depending on a number of factors, however, the active operation of RF front-end circuit 110 and internal interface circuit 410 may overlap to a certain extent. The system arranges in time the RF reception or transmission activities and the operation of internal interface circuit 410 so as to avoid or reduce interference between RF front-end circuit 110 and internal interface circuit 410.

As previously noted, one subsection of serial communications device 150 that may remain active during periods of RF activity is memory circuit 420, including memory 450, that buffers data transmitted to an external device, and memory 460, that buffers data received from an external device. In one embodiment memories 450 and 460 are first-in, first-out (FIFO) memories. In order to reduce the amount of digital noise and thus spurious signals that may be picked up by RF front-end circuit 110, it may be advantageous to reduce the size of memories 450 and 460 and/or implement separately activated memories such that one memory may be activated while all other memories are deactivated. However, larger memory capacity enables serial communications device 150 to support higher data rate communication while buffering data throughout periods of RF activity. Various sizes of memories 450 and 460 are possible, with each embodiment trading between large buffers, higher data rates, and higher noise levels versus smaller buffers, lower data rates, and lower noise levels. For example, in one implementation, memories 450 and 460 are 96-byte FIFOs. At a maximum data rate of 115.2 kilobits per second, assuming that the maximum RF time in a GSM mobile phone is the time to receive the frequency correction channel information (approximately 5 milliseconds), 96 bytes may be sufficient to provide continuous communication through a period of RF activity with an additional allowance of approximately 3 milliseconds to accommodate any delay before MCU 352 may begin communication after a period of RF activity ends.

Another subsection of serial communications device 150 that may remain active during periods of RF activity is flow control logic circuit 430, which provides the functions necessary to connect memory circuit 420 to an external device as well as the modem handshake functions. In some embodiments it may be desirable to reduce the number of logic elements in flow control logic circuit 430 in order to reduce the amount of digital noise and thus spurious signals that may be picked up by RF front-end circuit 110. As shown, flow control logic circuit 430 of the depicted embodiment includes clock generator 440, memory control logic 452, flow control logic 454, memory control logic 462, flow control logic 464, and autobaud detector 468, which will be described below.

In one embodiment, clock generator 440 receives a reference clock from system clock 390 and divides it to a lower frequency serial clock for use within other parts of serial communications device 150. The use of a lower frequency serial clock instead of the higher frequency system clock 390 may reduce the amount of digital noise and thus spurious signals that may be picked up by RF front-end circuit 110. MCU 352 may configure the clock divide ratio via one of the configuration registers 414. Various serial clock frequencies may be selected, depending on the desired application and the capabilities of the external device. When communication apparatus 100 is operated in a mode in which RF front-end 110 is not used, or in which large amounts of digital noise are acceptable (e.g., during testing), in some embodiments the clock divide ratio may be configured to produce a higher frequency serial clock, permitting faster serial communication.

One of the serial communications device functions that may be implemented within serial communications device 150 is autobaud detection. In one embodiment, autobaud detector 468 may be configured to process incoming serial data to determine its baud rate. In an exemplary implementation, autobaud detector 468 uses the serial clock from clock generator 440 to time the bit transitions of a pre-determined start character received from the external device. Once the baud rate of the received data stream has been detected, the same rate may be used by serial communications device 150 to transmit data to the external device. In one embodiment, a baud rate counter within autobaud detector 468 comprises a set of partitioned counters that are clocked by the serial clock. Depending on the specific configured clock divide ratio, one or more of the higher order partitions of these counters may be unnecessary for the counters to count to the next serial clock transition. If so, in one implementation, autobaud detector 468 may gate the clock driving the higher order partitions of these counters or otherwise disable the higher order partitions so as to reduce the amount of digital noise and thus spurious signals that may be picked up by RF front-end circuit 110.

The remaining components of flow control logic circuit 430 operate in concert to control the flow of data streams through serial communications device 150. Specifically, in one embodiment, memory control logic 452 and flow control logic 454 operate in the transmit path while memory control logic 462 and flow control logic 464 operate in the receive path.

In operation, memory control logic 452 may clock data into and out of memory 450, depending on the data rate of data received from the internal interface and the baud rate (determined by autobaud detector 468 or a known, fixed rate), respectively. In one implementation of flow control, memory control logic 452 may stop clocking data out of memory 450 in response to a flow control signal from flow control logic 464. Memory control logic 452 may also stop clocking data into memory 450 during a period when internal interface circuit 410 is configured to be inactive, such as during periods of RF activity. In addition, memory control logic 452 may deliver status information about memory 450 to MCU 352 via configuration registers 414.

Similarly, memory control logic 462 may clock data out of and into memory 460, depending on the data rate at which MCU 352 receives data via the internal interface and the baud rate (determined by autobaud detector 468 or a known, fixed rate), respectively. In one implementation, memory control 462 may stop clocking data out of memory 460 during a period when internal interface circuit 410 is configured to be inactive, such as during periods of RF activity. In addition, memory control logic 462 may deliver status information about memory 460 to MCU 352 via configuration registers 414. In one embodiment, in order to control the flow of data received from an external device, memory control logic 462 maintains a count of the number of bytes of data buffered in memory 460. If the count exceeds a high threshold, memory control logic 462 asserts a flow control signal as described below. If the count is below a low threshold, memory control logic 462 de-asserts a flow control signal as described below. The high and low thresholds may, in various embodiments, be configured to trigger flow control at selected percentages of the maximum capacity of memory 460, depending on the application and desired flow control behavior.

Serial communications device 150 may also support hardware and/or software flow control. Under hardware flow control, to control the flow of a transmission, flow control logic 454 may disable a data stream to the external device if a request to send (RTS) signal from the external device is de-asserted. Conversely, if the external device asserts the RTS signal, flow control logic 454 may enable the data stream to the external device. To control the flow of a reception, if memory control logic 462 asserts a flow control signal, flow control logic 464 asserts a clear to send (CTS) signal to the external device in response. Conversely, if memory control logic 462 de-asserts a flow control signal, flow control logic 464 de-asserts the CTS signal to the external device in response.

Under software flow control, rather than using standard modem signals RTS and CTS to control the flow of the data stream, start and stop flow control characters may be inserted into the data stream itself. In one embodiment of communication apparatus 100, because digital processing circuit 120 and MCU 352 may be disabled for several milliseconds during periods of RF activity, flow control logic circuit 430 may generate and process software flow control characters. More specifically, to control the flow of a transmission, flow control logic 464 may detect the presence of a start or stop flow control character in the data stream coming from the external device. If a stop character is detected, flow control logic 464 may signal flow control logic 454 to disable a data stream to the external device. If a start character is detected, flow control logic 464 may signal flow control logic 454 to enable the data stream to the external device. To control the flow of a reception, if memory control logic 462 sends a flow control signal to flow control logic 454, flow control logic 454 may insert a flow control character into the data stream output to the external device. This flow control character may be a stop or start character, depending on the condition of memory 460 as detected by memory control logic 462.

Under software flow control, if a data character matches a programmable software flow control character, then another programmable escape character is inserted into the data stream preceding the data character indicating that the next character is not to be handled as a flow control character. In one embodiment, serial communications device 150 may detect and remove escape characters from the received data stream and insert escape characters into the transmitted data stream. In particular, flow control logic 454 may insert an escape character preceding the normal transmission of a flow control character to the external device. Also, flow control logic 464 may detect an escape character in the data stream from the external device and remove it, passing only the escaped character to memory 460. Accordingly, serial communications device 150 may perform all of the software flow control functions including inserting, detecting, and removing flow control characters, enabling and disabling data flow, and inserting, detecting, and removing escape characters without the intervention of MCU 352.

In one specific implementation, serial communications device 150 may handle data internally as parallel 8-bit characters. In the illustrated embodiment, flow control logic 454 includes a circuit for converting parallel data from memory 450 to serial data for output to the external device. Similarly, flow control logic 464 includes a circuit for converting serial data from the external device to parallel data for input to memory 460. In a further embodiment, serial communications device 150 receives and transmits data plus a complete set of standard modem handshake signals including RTS and CTS. Modem handshake signals may conform to a serial interface standard such as EIA/TIA-232-E. In some embodiments, they may be conveyed via a multi-pin connecter and associated cable or, in other embodiments, through an IrDA-compatible interface to an external device.

Figure 5:
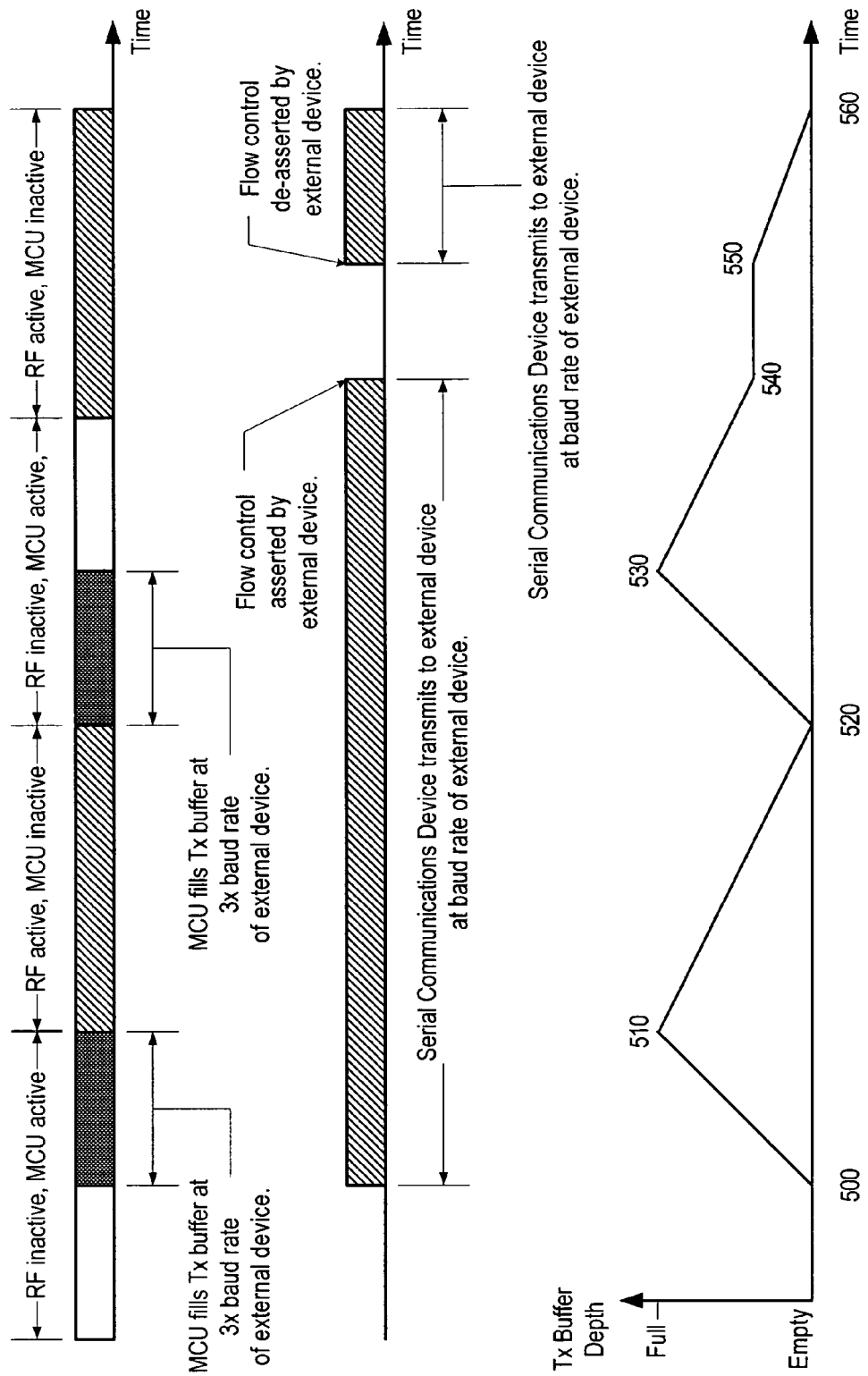
FIG. 5 illustrates the timing of a transmission or data through serial communications device 150.

As previously noted, during periods of RF activity, serial communications device 150 may continue to transmit buffered data to an external device and respond to flow control from the external device even though portions of serial communications device 150 are disabled. Accordingly, FIG. 5 illustrates the timing of a transmission of data through serial communications device 150. In the illustrated example, MCU 352 initiates a transmission during a period of RF inactivity at time 500. In one embodiment, MCU 352 may transmit a burst of data to serial communications device 150 in order to fill memory 450, the Tx buffer, prior to the start of a period of RF activity at time 510. In the illustrated example, MCU 352 transmits at a data rate of three times the baud rate at which serial communications device 150 transmits to the external device. The rate and duration of transmission from MCU 352 may vary depending on the application, message length, other program tasks of MCU 352, etc. as desired. A data rate of three times the baud rate was selected to simplify the illustration only. In operation, MCU 352 may transmit at any rate greater than the baud rate in order to fill memory 450 in a short burst. At time 500, serial communications device 150 may also begin transmitting data out of memory 450 to the external device at a known, fixed baud rate or a baud rate that is determined by autobaud detector 468. Once RF activity begins, MCU 352 may be disabled, halting the transmission of data into memory 450. However, as shown, serial communications device 150 may continue to transmit data from memory 450. At time 520, RF activity is completed and transmission from MCU 352 may resume. Depending on the number of data characters to be transmitted, MCU 352 may continue to transmit a message through portions of more than one period of RF inactivity. In the illustrated example, MCU 352 completes the transmission at time 530, once again filling memory 450.

Throughout the period between times 500 and 530, serial communications device 150 may transmit data to the external device while the number of characters buffered in memory 450, shown as the Tx buffer depth, rises and falls depending on the activity of MCU 352 and the flow control settings of the external device. After time 530, the Tx buffer depth begins to fall until time 540, when in the example illustrated, the external device de-asserts a flow control signal. In one embodiment, hardware flow control may be used. That is, the external device may de-assert an RTS signal, which is received by flow control logic 454. In an alternative embodiment, software flow control is configured so that flow control logic 464 may detect the presence of a stop flow control character in the data stream coming from the external device. In response, either method may cause flow control logic 454 to halt transmission and signal memory control logic 452 to stop clocking data out of memory 450. It is noted that between time 540 and 550, the Tx buffer depth remains constant. The external device may assert a flow control signal at time 550 indicating that it is ready to accept more data, again using either hardware or software flow control, depending on the specific implementation. If hardware flow control is enabled, the external device asserts RTS. If software flow control is enabled, the external device sends a start flow control character into the receive data stream, where it is detected by flow control logic 464. Either method causes flow control logic 454 to re-enable the transmission and clocking of memory 450, thus emptying buffer 450. As shown, at the baud rate of the illustrated example, the transmission to the external device is completed at time 560. It is noted that time 540 and time 550 may occur during a period of RF activity, as shown, and that serial communications device 150 performs flow control while MCU 352 and internal interface 410 are disabled.

Figure 6:
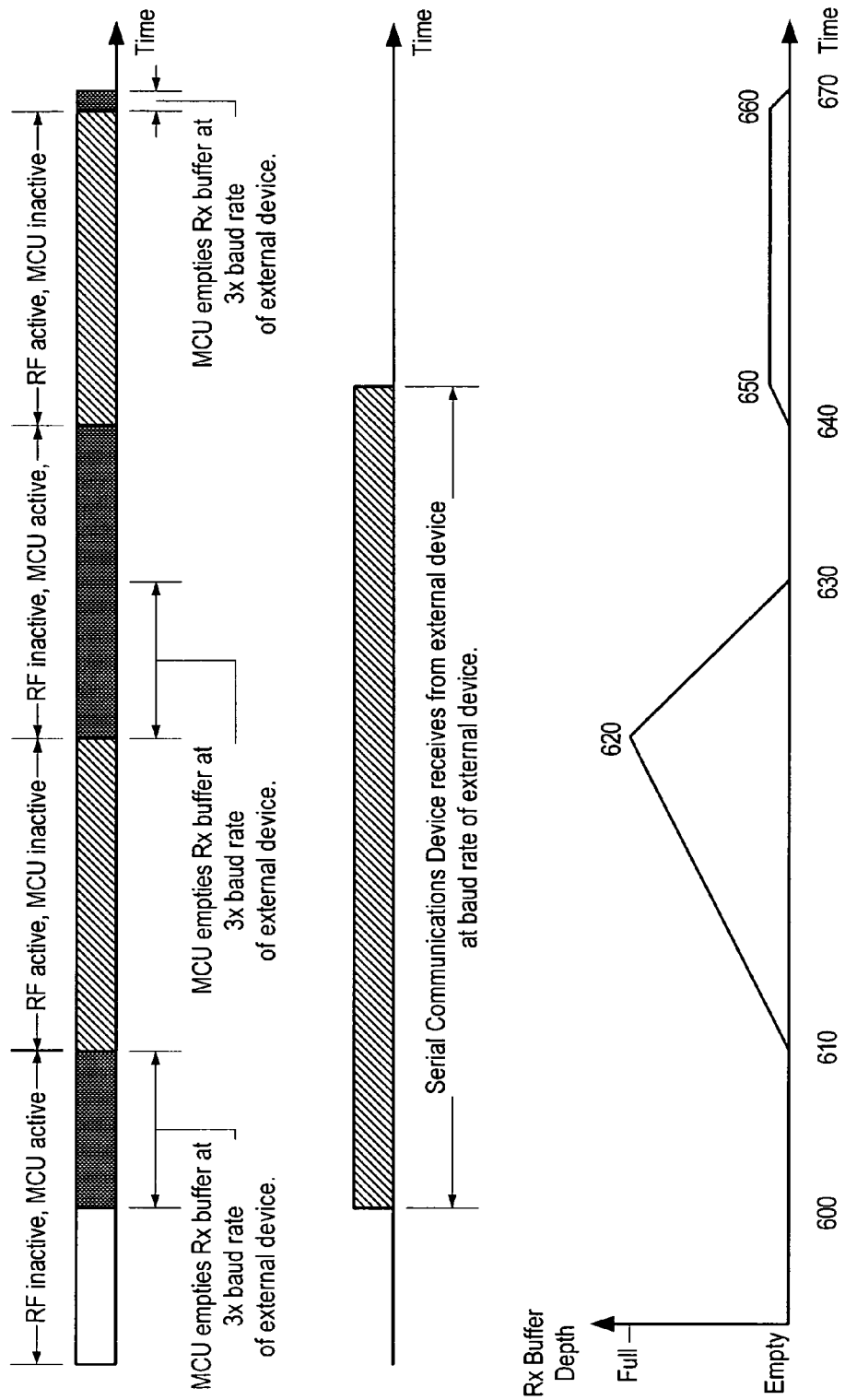
FIG. 6 illustrates the timing of a reception of data through serial communications device 150 without flow control.

Similarly, FIG. 6 illustrates the timing of a reception of data through serial communications device 150 when an external device is not capable of flow control or when flow control is disabled. In the illustrated example, an external device initiates a transmission to serial communications device 150 at time 600, during a period of RF inactivity. As shown, time 600 also marks the beginning of reception of data by memory 460. Because MCU 352 is active during this period of RF inactivity, MCU 352 may also begin receiving data between time 600 and time 610. In the illustrated example, MCU 352 receives data at three times the baud rate at which the external device transmits throughout the period between time 600 and time 610. Therefore, memory 460 remains essentially empty. More specifically, MCU 352 empties data from memory 460 as fast as it arrives, so that at time 610, when RF activity begins, the number of characters buffered in memory 460, shown as Rx buffer depth, is zero. The rate and duration of reception by MCU 352 may vary depending on the application, message length, other program tasks of MCU 352, etc. as desired. In one embodiment, MCU 352 is programmed to empty memory 460 just prior to the start of RF activity to maximize its buffer capacity during the subsequent period when MCU 352 is disabled. As the external device continues to transmit, the Rx buffer depth reaches a maximum at time 620. Then, as RF activity ends and MCU 352 is re-enabled, the Rx buffer depth drops, reaching zero in the illustrated example at time 630. Rx buffer depth may remain at essentially zero until the start of another period of RF activity, such as time 640, as shown. Again, Rx buffer depth begins to rise until time 650, when the transmission from the external device is complete. In the illustrated example, since time 650 occurs while MCU 352 is disabled, the Rx buffer depth remains constant until time 660, when RF activity ends and MCU 352 activity resumes. MCU 352 receives data from memory 460 until time 670 when the Rx buffer depth falls to zero. Various values of the size of memory 460, baud rate, rate of reception of data by MCU 352, and duration of the reception of data by MCU 352 prior to a period of RF activity may be configured to ensure that the Rx buffer depth does not exceed its maximum value should the external device transmit data continuously at the maximum data rate throughout a period of RF activity in the absence of flow control.

Figure 7:
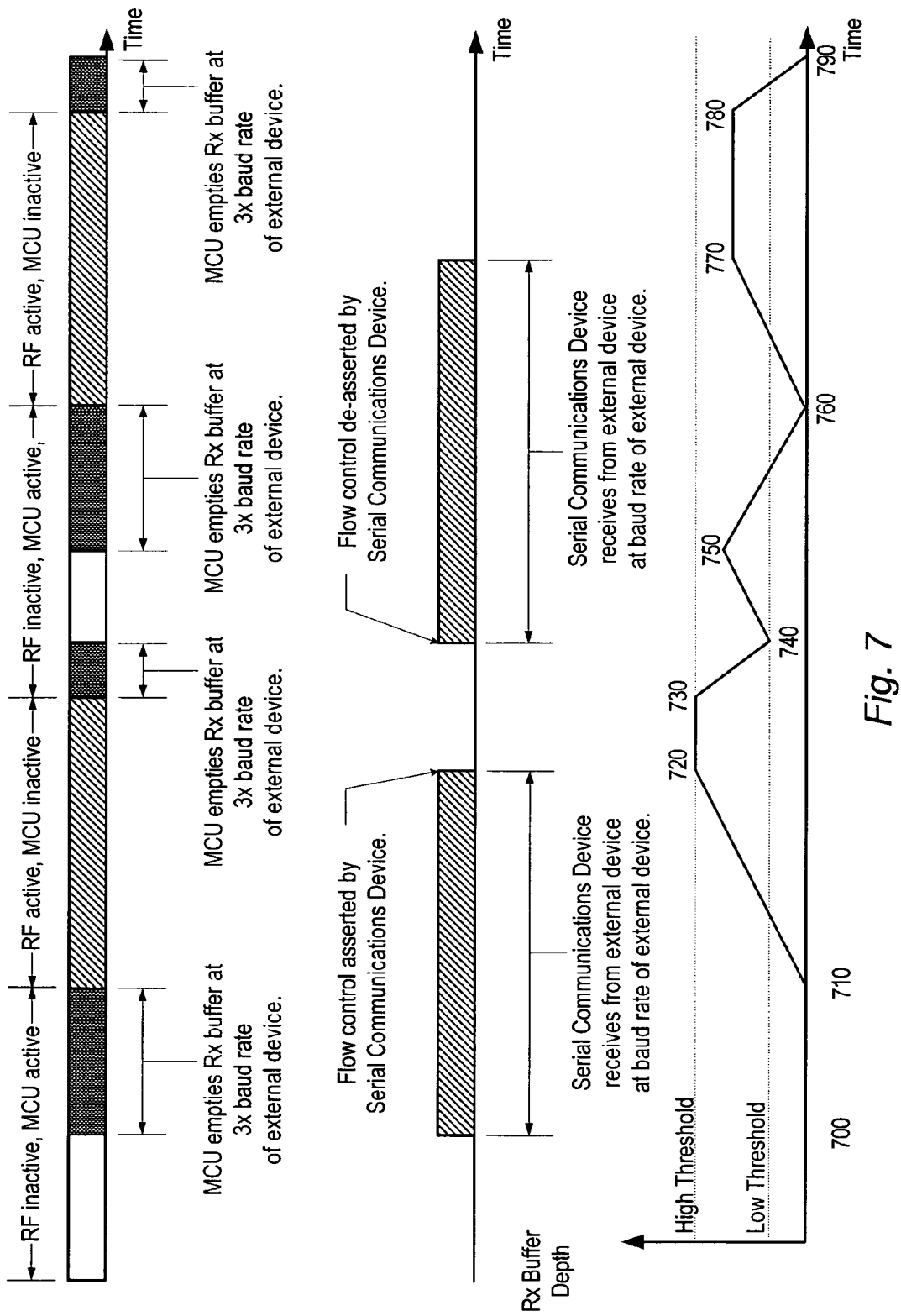
FIG. 7 illustrates the timing of a reception of data through serial communications device 150 with flow control.

FIG. 7 further illustrates the timing of a reception of data through serial communications device 150 when an external device is capable of flow control and flow control is enabled. In the illustrated example, an external device initiates a transmission to serial communications device 150 at time 700, during a period of RF inactivity. As shown, time 700 also marks the beginning of reception of data by memory 460 and MCU 352. As previously shown in the example illustrated in FIG. 6, because MCU 352 receives at three times the baud rate at which the external device transmits, memory 460 remains essentially empty. More specifically, MCU 352 empties data from memory 460 as fast as it arrives, so that at time 710, when RF activity begins, the Rx buffer is empty. Subsequently, as the external device continues to transmit, memory 460 fills, until the Rx buffer depth reaches a high threshold at time 720. In an exemplary implementation, time 720 occurs during a period of RF activity when MCU 352 may be disabled. In other implementations, MCU 352 may be busy executing other higher priority tasks. In either case, at time 720, MCU 352 may be unable to process flow control information. As a result, flow control is implemented within serial communications device 150, using either the hardware or software method.

At time 720, memory control logic 462 detects that the Rx buffer depth has reached the high threshold. In one implementation, under hardware flow control, memory control logic 462 signals flow control logic 464 to de-assert the CTS signal in response. According to the modem handshake protocol, de-assertion of CTS causes the external device to stop transmitting. Therefore, Rx buffer depth may remain constant between times 720 and 730 while the external device waits for flow control to signal that transmission may resume. Beginning at time 730, as RF activity ends and MCU 352 is re-enabled, the Rx buffer depth drops, reaching a low threshold in the illustrated example at time 740. At this time, memory control logic 462 detects that the Rx buffer depth has reached the low threshold and signals flow control logic 464 to assert the CTS signal.

In an alternative implementation, using software flow control, memory control logic 462 signals flow control logic 454 to insert a stop flow control character into the output data stream from serial communications device 150 at time 720. Operation proceeds as in the case of hardware flow control described above until time 740, when memory control logic 462 signals flow control logic 454 to insert a start flow control character into the output data stream from serial communications device 150.

In implementations using either hardware or software flow control, the external device may resume sending data to serial communications device 150 at time 740. MCU 352 may be programmed to receive data from memory 460 at this time or, as illustrated, perform other tasks between times 740 and 750, allowing the Rx buffer depth to rise. Then, at time 750, MCU 352 begins to empty memory 460 in anticipation of the next period of RF activity. RF activity resumes at time 760, when Rx buffer depth begins to rise until time 770, when the transmission from the external device is complete. In the illustrated example, since time 770 occurs while MCU 352 is disabled, the Rx buffer depth remains constant until time 780, when RF activity ends and MCU 352 activity resumes. Then, MCU 352 receives data from memory 460 until time 790, when the memory is empty.

It is noted that FIGS. 5, 6, and 7 illustrate only a few examples of many possible combinations of message length, periods of RF activity and inactivity, baud rates, buffer thresholds, etc. Flow control parameters such as the characters used to indicate stop and start, buffer thresholds, and the choice of either hardware or software control may vary considerably from embodiment to embodiment. It is further noted that considerable variation may exist in the specific hardware implementation of circuitry within serial communications device 150 that performs the buffering, autobaud detection, and flow control functions. For example, buffering may be implemented as random-access memory (RAM), programmable logic, first-in, first-out registers (FIFOs), or other storage technologies. Autobaud detection and flow control may be implemented using discreet logic elements, programmable logic, or combinations thereof.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A communication apparatus comprising:
a radio frequency (RF) circuit configured to operate on a radio frequency signal;
a digital processing circuit coupled to the RF circuit; and
a serial communications device comprising an internal interface circuit, the serial communications device coupled to the digital processing circuit and configured to buffer data communicated between the digital processing circuit and an external device;
wherein the internal interface circuit is disabled in response to an active mode of operation of the RF circuit to substantially minimize interference between the digital processing circuit and the serial communications device, and
wherein the serial communications device includes a flow control logic circuit configured to control a data stream between the communication apparatus and the external device while the at least a portion of the serial communications device is disabled.

2. The communication apparatus as recited in claim 1, wherein the serial communications device is a universal asynchronous receiver transmitter (UART) and wherein disabling the at least a portion of the serial communications device includes disabling data communications between the serial communications device and the digital processing circuit while allowing data communications between the serial communications device and the external device.

3. The communication apparatus as recited in claim 1, wherein at least a portion of the digital processing circuit is disabled in response to an active mode of operation of the RF circuit.

4. The communication apparatus as recited in claim 3, wherein the at least a portion of the digital processing circuit includes a processing unit configured to process data received from the external device; and
wherein the at least a portion of the serial communications device includes an interface to the processing unit.

5. The communication apparatus as recited in claim 4, wherein the serial communications device includes a memory configured to buffer data received from the external device and transmit the data to the processing unit via the interface.

6. The communication apparatus as recited in claim 5, wherein the flow control logic circuit is configured to assert a flow control signal to the external device to indicate that the external device is to stop sending data to the serial communications device, the flow control signal responsive to a number of data characters buffered in the memory exceeding a threshold value.

7. The communication apparatus as recited in claim 5, wherein the flow control logic circuit is configured to de-assert a flow control signal to the external device to indicate that the external device is to start sending data to the serial communications device, the flow control signal responsive to a number of data characters buffered in the memory being less than a threshold value.

8. The communication apparatus as recited in claim 5, wherein the flow control logic circuit is configured to detect a flow control character in a data stream from the external device at the same time as a previously received data character of the data stream is buffered in the memory.

9. The communication apparatus as recited in claim 8, wherein the flow control logic circuit is configured to convey the previously received data character to the processing unit for processing after detecting the flow control character.

10. The communication apparatus as recited in claim 8, wherein the flow control logic circuit is configured to detect the flow control character before a next data character of the data stream is buffered in the memory.

11. The communication apparatus as recited in claim 8, wherein the flow control logic circuit is configured to enable a transfer of data in the data stream to the external device in response to a detection of the flow control character.

12. The communication apparatus as recited in claim 4, wherein the serial communications device includes:
a first memory configured to temporarily buffer data received from the external device; and
a second memory configured to temporarily buffer data available for transmission to the external device.

13. The communication apparatus as recited in claim 12, wherein the flow control logic circuit is configured to transmit a flow control character to the external device if a number of data characters buffered in the first memory is greater than a threshold value.

14. The communication apparatus as recited in claim 13, wherein the flow control logic circuit is configured to transmit the flow control character before transmitting a next data character from the second memory to the external device.

15. The communication apparatus as recited in claim 12, wherein the flow control logic circuit is configured to transmit a flow control character to the external device if a number of data characters buffered in the first memory is less than a threshold value.

16. The communication apparatus as recited in claim 15, wherein the flow control logic circuit is configured to transmit the flow control character before transmitting a next data character from the second memory to the external device.

17. The communication apparatus as recited in claim 4, wherein the serial communications device includes a circuit configured to detect a baud rate of data received from the external device while the at least a portion of the serial communications device is disabled.

18. The communication apparatus as recited in claim 1, wherein the digital processing circuit includes a memory, and wherein the at least a portion of the serial communications device includes a direct memory access (DMA) interface coupled to the memory.

19. The communication apparatus as recited in claim 1, wherein the internal interface circuit connects the serial communications device digital processing circuit and is configured to enable at least one of bi-directional data transfer, control and status signals.

20. The communication apparatus as recited in claim 1, wherein the internal interface circuit comprises a memory interface, a DMA interface, and a bus interface.

21. A method of operating a communication apparatus including a radio frequency (RF) circuit, a digital processing circuit, and a serial communications device comprising an internal interface circuit, the serial communications device configured to communicate data between the digital processing circuit and an external device, the method comprising:
buffering data communicated between the digital processing circuit and the external device within the serial communications device;
disabling the internal interface circuit in response to an active mode of operation of the RF circuit to substantially minimize interference between the digital processing circuit and the serial communications device; and
controlling a data stream between the serial communications device and the external device while the at least a portion of the serial communications device is disabled.

22. The method as recited in claim 21, further comprising disabling at least a portion of the digital processing circuit in response to an active mode of operation of the RF circuit.

23. The method as recited in claim 21, further comprising:
receiving a data character in a first data stream from the external device;
buffering the data character;
detecting a presence of a flow control character in the first data stream;
enabling a second data stream to the external device if the flow control character is a start character; and
conveying the previously buffered data character to the digital processing circuit.

24. The method as recited in claim 21, further comprising:
receiving a data character in a first data stream from the external device;
buffering the data character;
detecting a presence of a flow control character in the first data stream;
disabling a second data stream to the external device if the flow control character is a stop character; and
conveying the previously buffered data character to the digital processing circuit.

25. The method as recited in claim 21, wherein the at least a portion of the serial communications device includes an interface to the digital processing circuit, further comprising:
enabling the at least a portion of the serial communications device in response to an inactive mode of the RF circuit;
transmitting data from the digital processing circuit to the serial communications device at a data rate that is greater than a data rate at which the data is transmitted from the serial communications device to the external device;
buffering the data within the serial communications device until a number of data characters buffered is greater than a threshold value;
disabling the at least a portion of the serial communications device; and
transmitting the data from the serial communications device to the external device while the at least a portion of the serial communications device is disabled.

26. The method as recited in claim 21, wherein the at least a portion of the serial communications device includes an interface to the digital processing circuit, further comprising:
enabling the at least a portion of the serial communications device in response to an inactive mode of the RF circuit;
receiving from the serial communications device to the digital processing circuit at a data rate that is greater than a data rate at which the data is received from the external device to the serial communications device, until a number of data characters buffered is less than a threshold value;
disabling the at least a portion of the serial communications device; and
buffering data received from the external device within the serial communications device while the at least a portion of the serial communications device is disabled.

27. A mobile phone comprising:
a radio frequency (RF) transceiver configured to operate on a radio frequency signal;
a digital processing circuit coupled to the RF transceiver; and
a serial communications device comprising an internal interface circuit, the serial communications device coupled to the digital processing circuit and configured to buffer data communicated between the digital processing circuit and an external device;
wherein the digital processing circuit includes a processing unit configured to process data received from the external device;

wherein the processing unit is disabled in response to an active mode of operation of the RF transceiver;

wherein the internal interface circuit of the serial communications device is disabled in response to the active mode of operation of the RF transceiver to substantially minimize interference between the digital processing circuit and the serial communications device and place the digital processing circuit in a shutdown mode of operation;

wherein the serial communications device includes a flow control logic circuit configured to control a data stream between the mobile phone and the external device while the at least a portion of the serial communications device is disabled; and wherein the RF transceiver, the digital processing circuit, and the serial communications device are fabricated on a single integrated circuit chip.

* * * * *